Patented Nov. 25, 1941

2,263,618

UNITED STATES PATENT OFFICE 2,263,618

LUBRICATION

Frederick B. Downing, Carneys Point, Anthony Francis Benning, Penns Grove, and Frank Willard Johnson, Pennsville, N. J., assignors to E. I. du Pont de Nemours & Company, Wilmington, Del., a corporation of Delaware No Drawing. Application November 24, 1939, Serial No. 305,892

12 Claims. (Cl. 252—48)

This invention relates to lubrication and particularly to the improvement of extreme pressure lubricating characteristics by the addition of assisting agents.

The advantages of a high pressure lubricant become apparent when the present trend in design of automotive and other machine parts, and the increased strength of metal parts, due to the use of alloy steels, is considered. The pressures ordinarily found in well lubricated journal bearings do not exceed 2,000 lbs./sq. in. and for conditions such as this a film of heavy oil can be expected to remain between the rubbing surfaces. When gears are considered, where the contact between surfaces is of very small width, the bearing pressures often reach values as high as 25,000 lbs./sq. in. Under such extreme pressure it is unlikely that any oil or grease can be obtained which will be viscous enough to prevent metallic contact. The result of the lack of a lubricating film between the rubbing surfaces results in scoring and scuffing of the gears.

Failure to maintain lubricant films on idle bearing surfaces is now well recognized as the cause of 70 to 80% of the wear occurring on cylinder walls of automotive and other internal combustion engines. When an engine is stopped, the oil film on the vertical surfaces soon drains off and, when the machine is again started up, an appreciable time elapses before the circulation provides oil for the formation of new lubricant films. An assistant which, when added to the motor oil, will prevent the separation of the oil film from the metal should prevent a large part of the wear now occurring.

Prior to this invention various assistants have been added to oils to improve their lubricating properties. Among such assisting materials which have been used are sulfur, sulfur chloride, sulfurized oil or oil containing naturally occurring sulfur, various heavy metal soaps and aluminum soaps, castor oil and, recently, aliphatic and aromatic halides. While some of these assistants, such as the sulfur and the organic halides improve the lubricating properties of the oil to a great extent, they have not proved to be satisfactory for use for the reason that they are corrosive or give rise to corrosive agents by hydrolysis or oxidation. Also, this corrosive action is greatly intensified by the presence of small amounts of water. Some of the alkyl halides are volatile and, hence, are soon lost. Other assistants such as the alkali and heavy metal soaps have proved to be of little value in improving the lubricating properties of the oils.

An object of this invention is to provide materials, which, when brought into contact with metal bearing surfaces, will form a lubricating film between such bearing surfaces, which lubricating film will adhere to the metal surfaces and resist high pressures. A further object of this invention is to provide materials which, when added to lubricating media, improve their properties, particularly their adhesiveness and resistance to high pressure. A still further object is to provide a method for retarding the wearing, scuffing and seizing of bearing surfaces, adapted to operate at high bearing pressures, by contacting such surfaces with materials which will form adherent films on such bearing surfaces, which films will not break down under high bearing pressures. Other objects are to provide new compositions of matter and to advance the art. Still other objects will appear hereinafter.

These objects may be accomplished in accordance with our invention which comprises maintaining a film of a lubricating medium between metal bearing surfaces and at the same time chemically acting upon such surfaces by means of an organic ester of a thio-acid of phosphorus. When such esters are brought into contact with a metal bearing surface under suitable conditions, they react with the metal of the bearing surface to form a chemical compound therewith which compound adheres to such surface forming a non-corrosive lubricating film which will retard the wear of the bearing surfaces, will withstand high bearing pressures and will prevent metallic contact of the bearing surfaces under high bearing pressures. The films have exceptional lubricating properties at all pressures but are particularly valuable at high bearing pressures and at high rubbing speeds. Such films will not be washed from the bearing surfaces by water, oil or organic solvents such as gasoline, naphtha and the like.

In general, the neutral esters of our invention must be employed with a lubricating medium which has sufficient body to provide thick film lubrication until the temperatures and pressures become sufficiently high to decompose the esters so that they will react on the metal bearing surfaces. The most satisfactory lubricating media are the ordinary lubricating oils and greases which include the animal and vegetable oils as well as the mineral oils.

Among the compounds which we have found to be particularly effective for our purpose are the aromatic and aliphatic esters of thio phosphorous acids. Among the aliphatic esters, those containing a carbon chain of at least 8 carbon atoms have proved to be the most effective and, of these, the mixed esters and mixtures of esters containing long chain alkyl groups are generally preferred because of their greater solubility in lubricating oils and greases.

When the expression "long chain aliphatic (or alkyl)" is employed hereinafter and in the claims, it will be understood that such expression means aliphatic or alkyl groups containing 8 or more carbon atoms. Also, when the term "thio-phosphorous acids" is employed hereinafter and in the claims, it will be understood that this term includes the mono-thio-, di-thio- and tri-thio phosphorous acids. The term "bearing surfaces" as employed herein and in the claims will be understood to mean surfaces which mutually carry a load and move relatively to each other.

The organic esters of the thio-phosphorous acids of our invention may be employed in any desired proportion. The addition of as small amount as 0.05% of such an ester to an oil will have a noticeable effect. However, for practical purposes it will generally be found desirable to employ at least 0.2% of the ester based on the oil. Further, the amount added to the oil or other carrier will be largely dependent upon the machinery in which it is applied and the area of the metal surfaces with which it will be brought into contact.

The method of testing our compounds was that devised by J. O. Almen (Oil and Gas Journal, 30, 109, 1931). This method consists of running a ¼" diameter drill rod between two halves of a split bushing which is maintained stationary. The load on the bushing is controllable and provision is made for measuring the torque developed by the friction of the lubricant film. A hydraulic system for increasing the loading on the bushing until the oil film breaks and the metal seizes is provided. The rubbing speed is about 50 feet per minute and the method of loading is gradual, one weight being added to the loading lever each ten seconds. Each weight added to the loading lever increases the pressure on the bushing by about 125 lbs. The machine provides for beam loadings up to 20 weights which corresponds to a pressure of 20,000 lbs./sq. in. on the full projected area of the drill rod. The bearing surface of the bushing is cut to a diameter 0.007 inch larger than the drill rod so that, before any wear occurs, the actual bearing surface is a line. As wear occurs, the bearing surface widens but seldom covers the bushing. After a test, the width of the bearing scar can be measured and an approximate value for the actual bearing pressure obtained. The values given in the following examples represent the calculated actual bearing pressures which were reached in the tests without failure of the film. These values represent film strength or film resistance.

When subjected to the above test, a good grade of paraffin oil will withstand a pressure of only 3 to 5,000 lbs./sq. in. When an oil containing sulfur is tested by the same method, such oil will show a film strength of about 20,000 lbs./sq. in. and will give a torque reading of over 4.0 lbs./ft. at this load.

The results, obtained with representative compounds of our invention, are shown in the following Table I:

*Table I*

| Compound | Calculated bearing pressure |
|---|---|
| | #/sq. in. |
| Trilauryl trithio phosphite | 42,000 |
| Triphenyl trithio phosphite | 28,000 |
| Triamyl trithio phosphite | 21,000 |

It will be noted that the aromatic and long chain aliphatic compounds produce materially higher film strength than the short chain aliphatic compounds, and hence, the long chain aliphatic and aromatic compounds are most effective for improving the extreme pressure properties of an oil. Also as shown by the above tests, our preferred compounds, the long chain alkyl compounds, are very much more effective as extreme pressure agents than either the aromatic compounds or the short chain aliphatic compounds.

The thio phosphites of our invention have further advantages over the corresponding phosphates and thio phosphates, in that they tend to inhibit the formation of sludge in petroleum oils, and also retard the corrosion of alloy bearings, such as silver-cadmium bearings, by petroleum oils.

The above merely illustrates the results obtained with a few of the compounds of our invention. Other compounds, coming within our invention, are:

Trilauryl monothio phosphite
Triphenyl monothio phosphite
Trioleyl trithio phosphite
Tristearyl trithio phosphite
Trimyristyl trithio phosphite
Trioctyl trithio phosphite
Triricinoleyl trithio phosphite
Tricetyl trithio phosphite
Tridecyl trithio phosphite
Trieicosyl trithio phosphite
Tricresyl trithio phosphite
Triphenyl trithio phosphite
Trinaphthyl trithio phosphite
Lauryl diphenyl trithio phosphite
Lauryl dicresyl trithio phosphite
Stearyl diphenyl trithio phosphite
Stearyl dicresyl trithio phosphite
Dilauryl phenyl trithio phosphite
Dilauryl cresyl trithio phosphite
Dioleyl phenyl trithio phosphite
Dioleyl cresyl trithio phosphite
Dilauryl xylenyl trithio phosphite
Trilauryl dithio phosphite
Tristearyl dithio phosphite
Trimyristyl dithio phosphite
Tricetyl dithio phosphite
Tridecyl dithio phosphite
Trioctyl dithio phosphite
Triphenyl dithio phosphite
Tricresyl dithio phosphite
Trixylenyl dithio phosphite
Trinaphthyl dithio phosphite
Dilauryl phenyl dithio phosphite
Dilauryl cresyl dithio phosphite
Dicetyl phenyl dithio phosphite
Dicetyl cresyl dithio phosphite
Lauryl diphenyl dithio phosphite
Lauryl dicresyl dithio phosphite
Trioleyl monothio phosphite
Trimyristyl monothio phosphite
Tricetyl monothio phosphite
Tridecyl monothio phosphite
Tricresyl monothio phosphite
Lauryl diphenyl monothio phosphite
Lauryl dicresyl monothio phosphite
Dilauryl phenyl monothio phosphite
Dilauryl cresyl monothio phosphite Similar compounds may be prepared from other alcohols such as decyl, undecenyl, ceryl, eleostearyl, linoleyl, ricinoleyl, abietyl, cyclohexanol, ethyl, octyl, tertiary amyl, butyl, propyl, benzyl, dodecahydro-diphenylol-propyl, naphthenyl, and mixtures thereof, particularly mixtures obtained by carboxylic reduction of naturally occurring fatty oils. Other aromatic esters may be prepared from phenol, cresols, naphthols, nitrophenols, alkoxyphenols, hexoxy-phenols, decahydro-naphthols, tetrahydro naphthols and the like. Still other compounds may be prepared from the aliphatic and aromatic mercaptans corresponding to the above alcohols and phenols. Other compounds containing two or more different aliphatic or aromatic radicals or both aliphatic and aromatic radicals may be employed.

Esters of the thio-phosphorous acids may be obtained by reacting phosphorus trichloride with mercaptans, thiophenols, mixtures of mercaptans and thiophenols, or mixtures of mercaptans or thiophenols or both mercaptans and thiophenols with alcohols or phenols or both alcohols and phenols, preferably, in the presence of an acid acceptor. The products of such reactions may be added to lubricating oils or greases in accordance with our invention. In some cases, the reaction may be carried out in the desired lubricating medium, thereby producing the thio phosphites in the medium and eliminating the necessity for isolating the thio phosphites.

From the preceding description it will be apparent that the organic esters generally of the thio phosphorous acids are lubricants for metallic bearing surfaces and suitable assistants to be added to lubricating oils, greases and other liquids to form lubricating compositions for metallic surfaces and will be effective at extreme pressures.

As has been brought out hereinbefore, the compounds of our invention, when brought into contact with metal bearing surfaces under suitable conditions, apparently react with the metal thereof to form an adherent film on the bearing surfaces which film will withstand high bearing pressures without breaking down and thus will prevent metallic contact of the bearing surfaces. When incorporated in an oil or grease, our compounds cause the oil or grease to adhere more firmly to the bearing surfaces. This is a particularly desirable and advantageous characteristic of our compounds, particularly adapting them for use where the bearing surfaces are vertical and an ordinary oil tends to drain therefrom as in the cylinders of internal combustion engines. Furthermore, the film produced by our compounds remains on the bearing surfaces even after the oil or other carrying media has been drained off and continues to exert its effect until worn off. Such film will not be removed by washing with water, gasoline, solvent naphtha and the like.

Our compounds are non-corrosive and, in fact, some of them will inhibit corrosion of metal by water. Our compounds are effective where the rubbing speeds are high as well as where they are low as in gears.

The fact that our compounds retain their extreme pressure lubricating characteristics in liquids other than oils and greases renders them particularly adapted for use as cutting oils, particularly in water emulsion. Our compounds may be employed in other liquids than those mentioned in the examples. For instance, they may be employed in benzene, gasoline, diphenyl, diphenyl oxide and any other liquid which is non-corrosive to metal and in which our compounds may be dissolved, dispersed or emulsified.

The use of cutting oils in machining operations is well known. The cutting fluid has two functions; the first to provide a lubricant to reduce the friction between the cutting tool and the work, and the second to provide a means for cooling the work.

The general practice is to use either an oil or a dispersion of oil in water. The oils used vary considerably depending on the particular operation and may vary from a light mineral oil to a heavy mixture of mineral and animal oils. The water suspensions are usually made up from oils by the addition of dispersing agents of the Turkey Red oil type. Recently the practice of adding sulfur or sulfur compounds has become common.

Die shaping of sheet metals and drawing of sheets and wires and tubes has also recently been improved by the use of a lubricant between the contacting surfaces.

Cutting oils are now generally made up by compounding about 30 parts of lard oil, one to five parts of sulfur, two to ten parts of a petroleum sulfonate or Turkey Red oil and about 60 parts of mineral oil. This mixture is then used undiluted or dispersed in water which improves its cooling properties.

The lard oil, of course, breaks down under the high temperature conditions of use resulting in the formation of disagreeably odorous materials. The presence of sulfur, as in motor and gear lubricants, is a possible source of corrosive material necessitating the careful washing of machined parts before use. These oils have also given considerable trouble from infection of the workmen which is only partially eliminated by the incorporation of a bactericide in the oil.

Wire drawing also requires an extreme pressure lubricant. Several types are in use but essentially they are the same as the ordinary cutting oils.

The pressures between the rubbing surfaces during all machining operations are obviously very high as they result in deformation of the metal. This is, therefore, another problem of extreme pressure lubrication.

Our compounds may be used in water, oil or other suitable media as cutting oil compositions with the attending elimination of the odors and corrosiveness which are objectionable properties of most prior cutting oils. They will be effective at very low concentrations in oil and can be used in water directly without the use of an oil medium.

Other improvements, similar to those observed on bearing lubrication, should also result from such use. Decreased friction, safety from corrosion, and improved quality of the work are important results of their use.

Some of the compounds of our invention are well known and the methods for making them are also well known and described in the literature. Other compounds of our invention can be prepared by the methods described in the literature. Suitable methods of preparing compounds of our invention are described in U. S. Patent No. 2,063,629. Accordingly, a more detailed description of the methods to be employed for making the compounds, referred to in this application, is believed to be unnecessary.

This application is a continuation-in-part of our copending application, Serial No. 712,610, filed February 23, 1934, for "Lubrication" and our copending application, Serial No. 57,506, filed January 4, 1936, for "Lubrication."

While we have disclosed specific embodiments of our invention, it will be readily apparent to those skilled in the art that many modifications and variations may be made therein without departing from the spirit of our invention. Accordingly, the scope of our invention is not to be limited solely by the specific embodiments disclosed in our specification for illustrative purposes, but we intend to claim our invention broadly, as in the appended claims.

We claim:

1. The method of retarding the wearing, scuffing and seizing of relatively moving bearing surfaces which comprises maintaining therebetween a film of a lubricating medium selected from the group of lubricating oils and greases and at the same time chemically acting upon such surfaces by means of an organic ester of a thiophosphorous acid.

2. The method of retarding the wearing, scuffing and seizing of relatively moving bearing surfaces which comprises maintaining therebetween a film of a lubricating medium selected from the group of lubricating oils and greases and at the same time chemically acting upon such surfaces by means of a hydrocarbon ester of a thiophosphorous acid.

3. High pressure lubricants comprising lubricating oils and greases having incorporated therein an organic ester of a thiophosphorous acid.

4. High pressure lubricants comprising lubricating oils and greases having incorporated therein a hydrocarbon ester of a thiophosphorous acid.

5. High pressure lubricants comprising lubricating oils and greases having incorporated therein a long chain alkyl ester of a thiophosphorous acid.

6. High pressure lubricants comprising lubricating oils and greases having incorporated therein mixtures of long chain alkyl esters of a thiophosphorous acid.

7. High pressure lubricants comprising lubricating oils and greases having incorporated therein an aromatic ester of a thiophosphorous acid.

8. High pressure lubricants comprising lubricating oils and greases having incorporated therein an aryl ester of a thiophosphorous acid.

9. High pressure lubricants comprising lubricating oils and greases having incorporated therein a long chain aliphatic ester of a thiophosphorous acid.

10. High pressure lubricants comprising lubricating oils and greases having incorporated therein trilauryl monothio phosphite.

11. High pressure lubricants comprising lubricating oils and greases having incorporated therein lauryl dicresyl monothio phosphite.

12. High pressure lubricants comprising lubricating oils and greases having incorporated therein tricresyl dithio phosphite.

FREDERICK B. DOWNING.
ANTHONY FRANCIS BENNING.
FRANK WILLARD JOHNSON.